(12) United States Patent
Robert et al.

(10) Patent No.: US 11,539,947 B2
(45) Date of Patent: Dec. 27, 2022

(54) REFINEMENT OF INTERNAL SUB-BLOCKS OF A CODING UNIT

(71) Applicant: INTERDIGITAL VC HOLDINGS, INC., Wilmington, DE (US)

(72) Inventors: Antoine Robert, Cesson-Sevigne (FR); Tangi Poirier, Cesson-Sevigne (FR); Simon Danten, Rouvroy-en-santerre (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 2 days.

(21) Appl. No.: 16/642,562

(22) PCT Filed: Aug. 31, 2018

(86) PCT No.: PCT/US2018/049009
§ 371 (c)(1),
(2) Date: Feb. 27, 2020

(87) PCT Pub. No.: WO2019/046673
PCT Pub. Date: Mar. 7, 2019

(65) Prior Publication Data
US 2020/0195925 A1    Jun. 18, 2020

(30) Foreign Application Priority Data

Sep. 1, 2017  (EP) ..................................... 17306130

(51) Int. Cl.
*H04N 19/53*   (2014.01)
*H04N 19/119*   (2014.01)
(Continued)

(52) U.S. Cl.
CPC ......... *H04N 19/119* (2014.11); *H04N 19/176* (2014.11); *H04N 19/52* (2014.11); *H04N 19/55* (2014.11)

(58) Field of Classification Search
CPC .. H04N 19/176; H04N 19/513; H04N 19/523; H04N 19/119
See application file for complete search history.

(56) References Cited

U.S. PATENT DOCUMENTS 8,675,736 B2    3/2014  Huang et al.
9,143,795 B2    9/2015  Zhou et al.
(Continued)

FOREIGN PATENT DOCUMENTS

CA        2912451 A1    7/2017
RU      2011101514 A    8/2012
(Continued)

OTHER PUBLICATIONS

Algorithm description of the Join Exploration Test Model 5; Jan. 2017. (Year: 2017).*
(Continued)

*Primary Examiner* — Luis Perez-Fuentes
(74) *Attorney, Agent, or Firm* — Jamie T. Nguyen (57) ABSTRACT

Motion information for an internal sub-block of a larger block can be derived for use in encoding or decoding the video block or a coding unit by using the motion information for sub-blocks on the left or top edge of the coding block. The left column of edge sub-blocks and the top row of sub-blocks has motion information, such as motion vectors, derived using such techniques as template matching. The motion vectors of these edge sub-blocks are used in deriving the motion vectors of internal sub-blocks, which leads to better prediction and improved coding efficiency. In another embodiment, other motion information for internal sub-blocks is derived from corresponding information of the edge sub-blocks.

26 Claims, 12 Drawing Sheets

(51) Int. Cl.
*H04N 19/176* (2014.01)
*H04N 19/52* (2014.01)
*H04N 19/55* (2014.01)

(56) References Cited

U.S. PATENT DOCUMENTS

| | | | | |
|---|---|---|---|---|
| 9,288,494 | B2* | 3/2016 | Xu | H04N 19/11 |
| 9,438,908 | B1 | 9/2016 | Sheng et al. | |
| 10,491,917 | B2* | 11/2019 | Chen | H04N 19/159 |
| 10,595,035 | B2* | 3/2020 | Karczewicz | H04N 19/513 |
| 10,602,180 | B2* | 3/2020 | Chen | H04N 19/54 |
| 10,638,152 | B2* | 4/2020 | Chuang | H04N 19/513 |
| 10,701,366 | B2* | 6/2020 | Chen | H04N 19/124 |
| 10,750,203 | B2* | 8/2020 | Chen | H04N 19/523 |
| 10,873,755 | B2* | 12/2020 | Deng | G06T 7/238 |
| 10,999,595 | B2* | 5/2021 | Lin | H04N 19/517 |
| 11,006,106 | B2* | 5/2021 | Liu | H04N 19/91 |
| 11,070,838 | B2* | 7/2021 | Robert | H04N 19/176 |
| 11,082,697 | B2* | 8/2021 | Zheng | H04N 19/147 |
| 2010/0284466 | A1 | 11/2010 | Pandit et al. | |
| 2011/0026596 | A1 | 2/2011 | Hong | |
| 2011/0103487 | A1 | 5/2011 | Pateux et al. | |
| 2015/0195566 | A1 | 7/2015 | Stegemann et al. | |
| 2016/0112717 | A1 | 4/2016 | Samuelsson et al. | |
| 2016/0286230 | A1 | 9/2016 | Li et al. | |
| 2016/0286232 | A1 | 9/2016 | Li et al. | |

FOREIGN PATENT DOCUMENTS

| | | |
|---|---|---|
| WO | WO2016201094 | 12/2016 |
| WO | WO2017036414 | 3/2017 |

OTHER PUBLICATIONS

_ Library-USPTO query; 2022. (Year: 2022).*
_ NPL Google Search query; 2022. (Year: 2022).*
_ Simplification and improvement on FRUC; 2017. (Year: 2017).*
_ Enhanced Template Matching in FRUC Mode; Jan. 2017. (Year: 2017).*
_ Algorithm description of the Join Exploration Test Model 7; Jan. 2017. (Year: 2017).*
Zhang et al., Motion Vector Derivation of Deformable Block, 2012 19th IEEE International Conference on Image Processing (ICIP 2012).
Songwei, et al., Deformable Motion Model for Frame Rate Up-Conversion in Video Coding, 2016 IEEE Region 10 Conference (TENCON). Proceedings.
Chen, et al., Algorithm Description of Joint Exploration Test Model 6 (JEM6), 6. JVET Meeting, Mar. 31, 2017-Apr. 7, 2017, Hobart, The Joint Video Exploration Team of ISO/IEC JTC1/SC29/WG11 and ITU-T SG.16, URL: http://phenix.int-evry.fr/jvet/, No. JVET-F1001, May 31, 2017.
Chen, et al., Algorithm Description of Joint Exploration Test Model 7 (JEM 7), Joint Video Exploration Team (JVET) of ITU-T SG 16 WP 3 and ISO/IEC JTC 1/SC 29/WG 11 7th Meeting; Torino, IT, Jul. 13-21, 2017, Documents: JVET-G1001-v1.
Chen, et al., Algorithm Description of Joint Exploration Test Model 6 (JEM6), Joint Video Exploration Team (JVET) of ITU-T SG WP 3 and ISO/IEC JTC 1/SC 29/WG 11, 6th Meeting, Hobart, AU, Mar. 31-Apr. 7, 207, JVET-F1001-v3.
ITU-T H.265: "High efficiency video coding", Series H: Audiovisual and Multimedia Systems, Infrastructure of audiovisual services—Coding of moving video, Oct. 2014, 540 pages.

* cited by examiner

REFINEMENT OF INTERNAL SUB-BLOCKS OF A CODING UNIT

FIELD OF THE INVENTION

The present principles relate to the field of video compression.

BACKGROUND OF THE INVENTION

In the HEVC (High Efficiency Video Coding of International Telecommunication Union, ITU-T H.265) video compression standard, a picture is divided into so-called Coding Tree Units (CTU), whose size is typically 64×64, 128×128, or 256×256 pixels.

Figure 1:
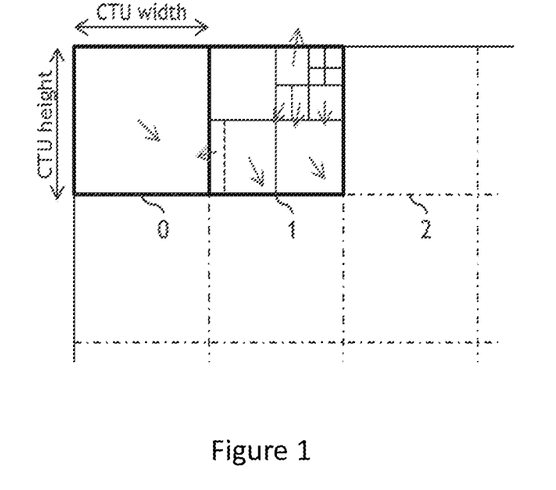
FIG. 1 shows an example of a coding tree unit and coding tree concepts to represent a compressed HEVC picture.

Each CTU is represented by a Coding Tree in the compressed domain. This is a quad-tree division of the CTU, where each leaf is called a Coding Unit (CU), as shown in FIG. 1.

Each CTU is represented by a Coding Tree in the compressed domain. This is a quad-tree division of the CTU, where each leaf is a Coding Unit (CU), as shown in FIG. 1.

Figure 2:
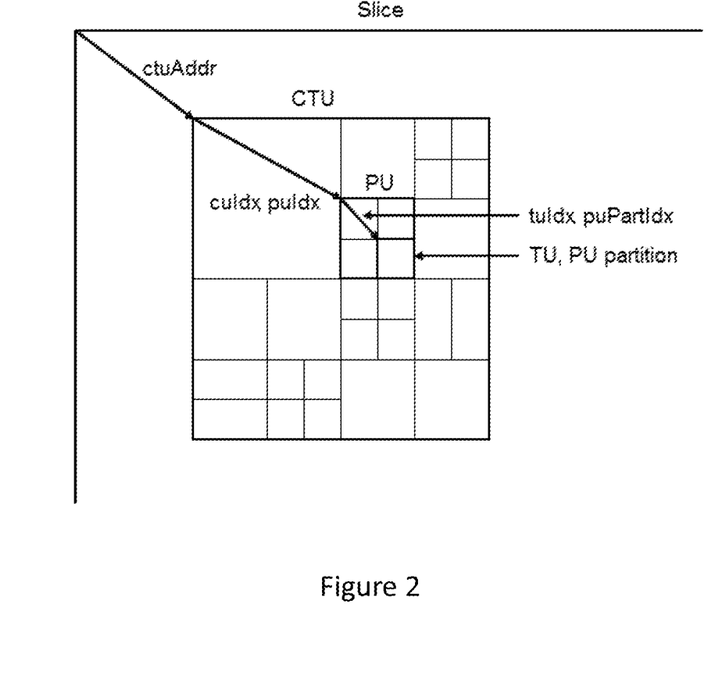
FIG. 2 shows an example of division of a coding tree unit into coding units, prediction units, and transform units.
Figure 3:
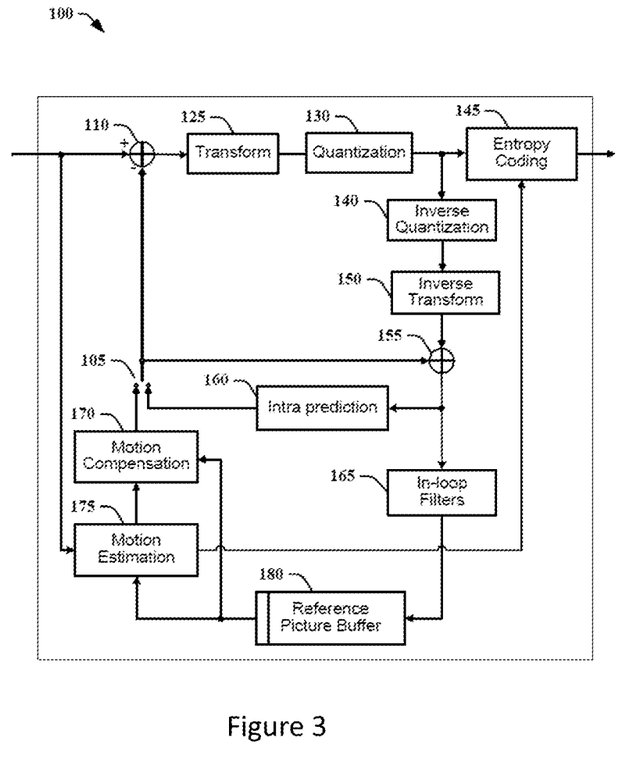
FIG. 3 shows one example of a generic video compression scheme to which the present embodiments can be applied.
Figure 4:
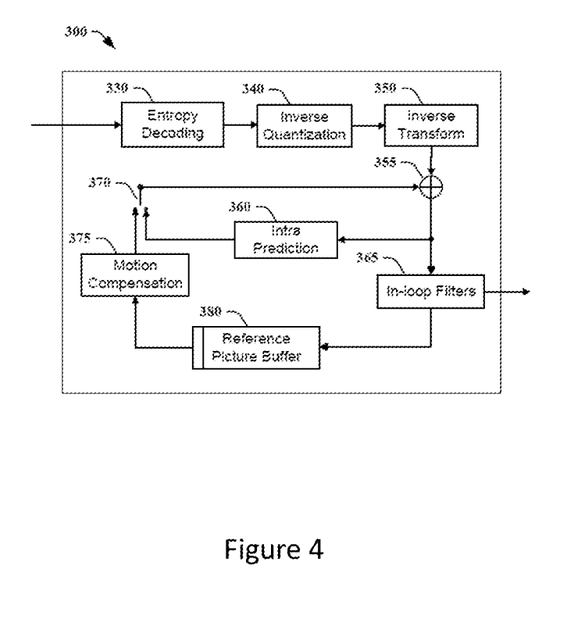
FIG. 4 shows one example of a generic video decompression scheme to which the present embodiments can be applied.

Motion compensated temporal prediction is employed to exploit the redundancy that exists between successive pictures of a video. To do so, a motion vector is associated with each prediction unit (PU). Each CU is then given some Intra or Inter prediction parameters (Prediction Info) and is spatially partitioned into one or more Prediction Units (PUs), each PU being assigned some prediction information. The Intra or Inter coding mode is assigned on the CU level, as shown in FIG. 2.

In HEVC, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

Exactly one Motion Vector is assigned to each PU in HEVC. This motion vector is used for motion compensated temporal prediction of the considered PU.

In the Joint Exploration Model (JEM) developed by the JVET (Joint Video Exploration Team) group, a CU is no longer divided into PU or TU, and some motion data is directly assigned to each CU. In this new codec design, a CU can be divided into sub-CU and a motion vector can be computed for each sub-CU.

Several new tools can further divide a CU into sub-blocks and derive one motion vector for each of these sub-blocks. The FRUC and Affine tools use such sub-block motion derivation, and OBMC (Overlapped Block Motion Compensation) and BIO (Bi-directional Optical Flow) perform in quite the same way.

Some of these tools, or in some precise configurations, use neighboring encoded and reconstructed parts of the image. In that case, it is not possible for those tools to derive a motion vector for the internal sub-blocks, i.e. the sub-blocks not in the first row and/or column.

New emerging video compression tools include a Coding Tree Unit representation in the compressed domain to represent picture data in a more flexible way in the compressed domain. The advantage of this flexible representation of the coding tree is that it provides increased compression efficiency compared to the CU/PU/TU arrangement of the HEVC standard.

With these new video compression tools, there is no longer partitioning of a CU into predictions units or transform unit. In other words, each Coding Unit is systematically made of a single prediction unit (previously 2N×2N prediction unit partition type) and a single transform unit (no division into a transform tree).

SUMMARY OF THE INVENTION

These and other drawbacks and disadvantages of the prior art are addressed by at least one of the described embodiments, which are directed to a method and apparatus for deriving the motion vectors of internal sub-blocks of a coding unit coded with a tool using sub-block level and reconstructed neighboring information.

In at least one embodiment, it is proposed to improve motion derivation for internal sub-blocks by taking advantage of previously refined sub-blocks.

According to at least one general embodiment described herein, there is provided a method for coding a block of video data. The method comprises steps for deriving information for a block of video data from neighboring blocks previously encoded; refining the information for sub-blocks along a left or top edge of the block of video data by using the derived information and neighboring sub-blocks previously encoded; refining the information for internal sub-blocks of the block of video data by using the refined information from sub-blocks along a left or top edge of the block of video data; and, encoding the block of video data using said refined sub-blocks.

According to another aspect described herein, there is provided a method for decoding a block of data. The method comprises deriving information for a block of video data from neighboring blocks previously encoded; refining the information for sub-blocks along a left or top edge of the block of video data by using the information and neighboring sub-blocks previously encoded; refining the information for internal sub-blocks of the block of video data by using the refined information from sub-blocks along a left or top edge of the block of video data; and, decoding the block of video data using said refined sub-blocks.

According to another aspect described herein, there is provided apparatus for coding or decoding a block of video data, comprising: a memory, and a processor, configured to perform: deriving information for a block of video data from neighboring blocks previously encoded; refining the information for sub-blocks along a left or top edge of the block of video data by using the information and neighboring sub-blocks previously encoded; refining the information for internal sub-blocks of the block of video data by using the refined information from sub-blocks along a left or top edge of the block of video data; and, encoding or decoding the block of video data. The apparatus can execute any of the aforementioned method embodiments with variations.

According to another aspect described herein, there is provided a nontransitory computer readable storage medium containing data content generated according to the method of any one of the aforementioned method embodiments, or by the apparatus of any one of the aforementioned apparatus embodiments for playback using a processor.

According to another aspect described herein, there is provided a signal comprising video data generated according to the method of any one of the aforementioned method embodiments for coding a block of video data, or by the apparatus of any one of the aforementioned apparatus embodiments for coding a block of video data, for playback using a processor.

According to another aspect described herein, there is provided a computer program product comprising instructions which, when the program is executed by a computer, cause the computer to carry out the method of any one of the aforementioned method embodiments.

These and other aspects, features and advantages of the present principles will become apparent from the following detailed description of exemplary embodiments, which is to be read in connection with the accompanying drawings.

DETAILED DESCRIPTION

In the HEVC video compression standard, a picture is divided into so-called Coding Tree Units (CTU), with typical sizes of 64×64, 128×128, or 256×256 pixels.

Each CTU is represented by a Coding Tree in the compressed domain. This is a quad-tree division of the CTU, where each leaf is called a Coding Unit (CU), see FIG. 1.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain to represent picture data in a more flexible way in the compressed domain. The advantage of this flexible representation of the coding tree is that it provides increased compression efficiency compared to the CU/PU/TU arrangement of the HEVC standard.

The problem solved by the described embodiments is how to derive motion vectors for internal sub-blocks, to increase the overall compression performance of the considered video codec.

In the state of the art approach, Coding Units coded with a tool using sub-block motion derivation from neighboring reconstructed part of the image cannot address internal sub-blocks. The basic idea proposed herein is to derive the Motion Vector of an internal sub-block in an encoder/decoder.

The Frame Rate Up Conversion (FRUC) tool of the prior art derives motion vectors with some template matching technique. Such techniques allow extraction of the best motion vector within a set of candidates, and then refining it towards the best template matching. FRUC firstly performs at the entire CU level. The obtained refined motion vector is then used as a seed for the sub-block level where it repeats the process for each sub-block independently.

Figure 5:
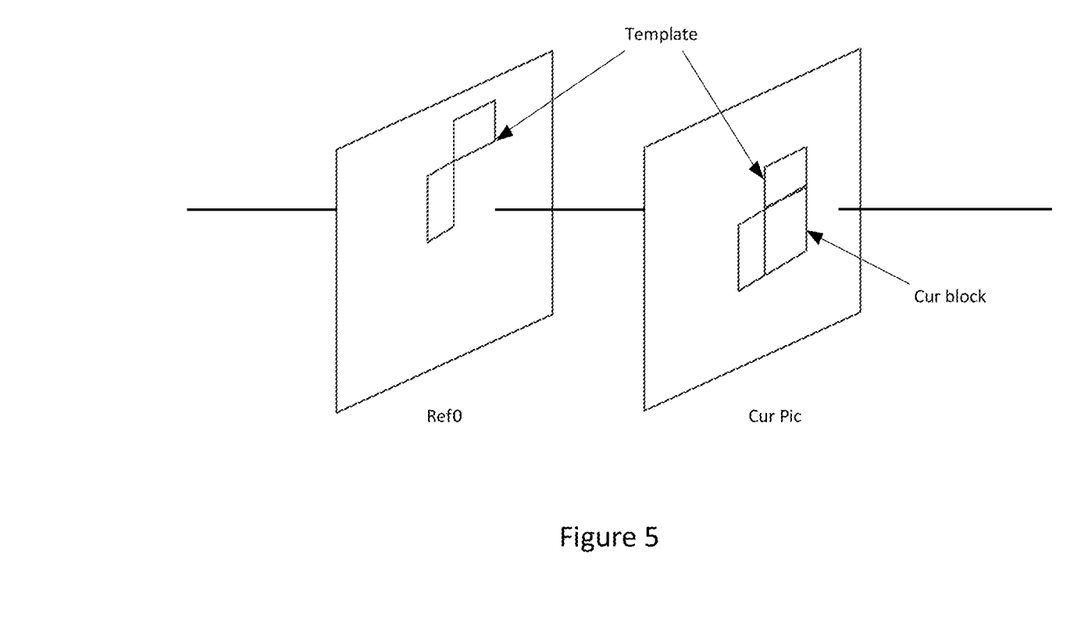
FIG. 5 shows an example prior art FRUC Template matching process of an internal coding unit.

The first step consists in deriving the refined motion vector for the whole CU. FRUC collects motion vector candidates picked from some spatial and temporal neighbors. For each of those candidates, the corresponding template(s) as the spatial top and/or left neighboring image block(s) are picked within the associated reference frame as shown in FIG. 5. The associated template matching cost is then the SAD (Sum of Absolute Differences) between the candidate template(s) and the current template(s). The candidate reaching the minimum template matching cost is defined as the best representative one. Then, this best candidate is refined towards the minimum template matching cost by adding small deltas to this motion vector (using diamond, square, cross, patterns, for example, or some other pattern).

Figure 6:
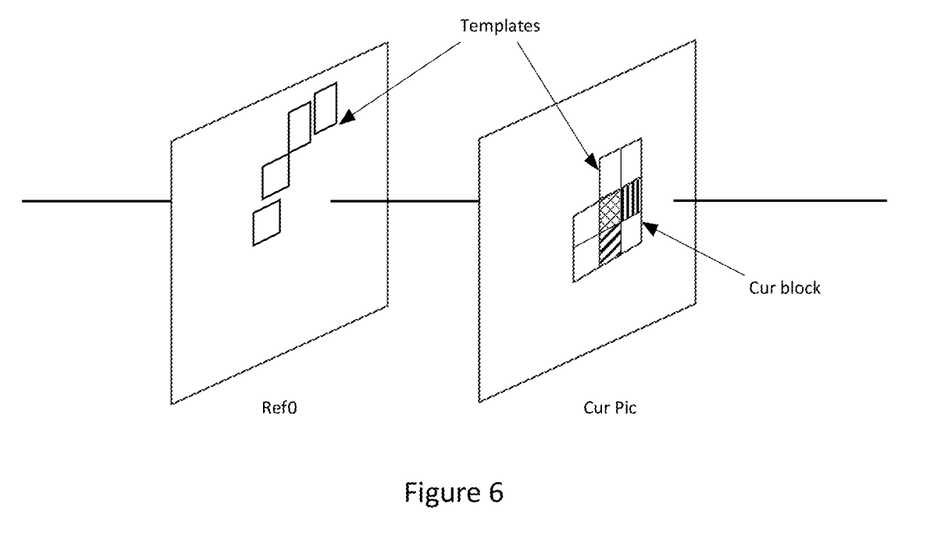
FIG. 6 shows another example prior art FRUC Template matching process of sub-blocks of an internal coding unit.

This FRUC process is then repeated at a sub-block level (of size 4×4 or 8×8 depending on the size of the entire CU). The refined motion vector of the whole CU is used as a candidate for the sub-blocks as well as some other potential candidates. For each sub-block, when a current template (as the spatial top and/or left neighboring image block(s)) is available, the best candidate is extracted according to the template matching cost, and then refined towards the minimum template matching cost. When no current template is available, the sub-block motion vector is affected to the whole CU refined one. For CUs which are not on the border of a frame, the first top-left sub-block can use top and left templates (crossed sub-block in FIG. 6) while the remaining ones on the first row (respectively column) can only use top (resp. left) template (vertical (resp. horizontal) stripped sub-block in FIG. 6). The other internal sub-blocks (white sub-block In FIG. 6) cannot benefit of the template refinement and directly use the refined motion vector of the entire CU.

In quite the same way as FRUC, the improvement of the AMVP motion compensation (proposed in "Motion Compensation at a finer precision than Motion Vector Differential") allows refining at a sub-block level the incoming integer- or ¼-pel AMVP motion vector to ¹⁄₁₆-pel accuracy using neighboring information.

The first row and column of sub-blocks can use spatial and/or temporal neighboring information directly, or with a FRUC process, to increase the precision of their motion vectors. For all other internal sub-blocks, such neighbors are not available, because they have not already been encoded and decoded. It is thus not possible to use the same process as for the border sub-blocks.

A main limitation of the prior art sub-block processes is that all internal sub-block information cannot be improved as with the other (i.e. border) sub-blocks, they can only be conformed to the incoming or refined motion vector of the whole CU.

This section describes the proposed method to derive information for internal sub-blocks of a CU.

The described embodiments aim at improving the motion derivation for internal sub-blocks of a CU by taking advantage of the already derived motion information.

In the FRUC tool, the first row and column of sub-blocks can be derived with the template matching as described in the state-of-the-art. The remaining internal sub-blocks are not derived as the other, they just use the refined value of the whole CU.

In a first embodiment, it is possible to improve the motion derivation for those sub-blocks by taking advantage of first refined ones.

To do so, it is possible to use the neighboring refined motion vectors, spatial and/or temporal.

Only one neighbor can be considered: (i) the same as the best candidate, (ii) a predefined neighbor (for example, always the spatial left neighbor), (iii) the first encountered one having a different value than the incoming refined MV, (iv) the one having the closest MV to the refined incoming one, or some other candidate. In that case, the internal sub-block MV takes the value of the selected neighboring motion vector.

In a variant, it is also possible to consider several neighbors: (i) the set (or a subset) of (classical) spatial neighbors, (ii) the first 2, 3, . . . encountered ones having a different value than the incoming refined motion vector, (iii) the 2, 3, . . . having the closest motion vector to the incoming refined one, or some other. In this case, the internal sub-block motion vector is filled with the average, the median, or any other combination of the considered neighboring motion vectors.

In another variant, it is also possible to consider the incoming refined motion vector as part of a combination with one or several neighboring motion vectors.

In another variant, it is also possible to consider a more complex motion model involving all the sub-block refined motion vectors of the first row and column and the one of the whole CU. Such a model could be an affine model, a parametric one, some model based on another.

In a variant, it is also possible to use different motion derivation methods for different sub-blocks. For example, the first row and column of internal sub-blocks (second ones of the CU) can use several neighboring motion vectors and the whole CU refined MV, less neighboring MVs and the whole CU refined MV for the second column and row, and finally using the closest neighboring motion vector to the whole CU refined motion vector for all following sub-blocks.

Such motion derivation cannot only be applied to FRUC, but can also be applied on AMVP motion compensation.

The first embodiment above is dedicated to motion vector (as in the case of FRUC), but in a second embodiment, it can be applied on another kind of information used by other sub-block tool.

Figure 7:
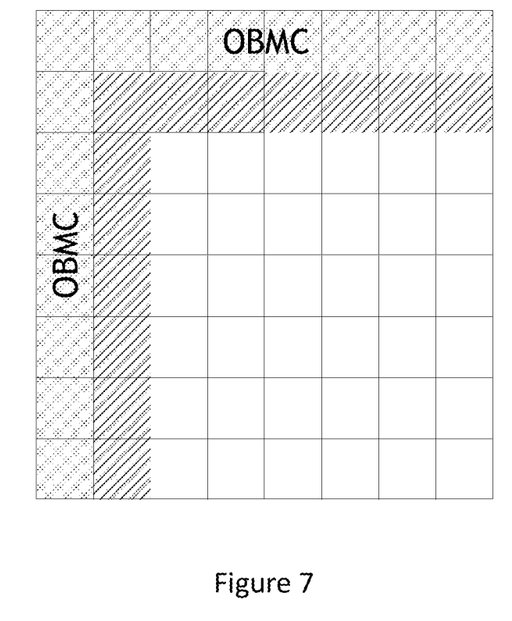
FIG. 7 shows an example OBMC propagation over the second row and column of a large coding unit.

For example, OBMC performs like a motion smoothing across the CU boundaries. It just affects the first row and column of sub-blocks, and nothing is done on the internal sub-blocks. It can be useful to propagate the smoothing even more inside the CU, in particular for very large CUs, in at least one row and column of internal sub-blocks as presented in FIG. 7.

In a preferred embodiment, the same process is used to improve motion derivation for internal sub-blocks of the FRUC tool and the enhanced AMVP motion compensation.

Figure 8:
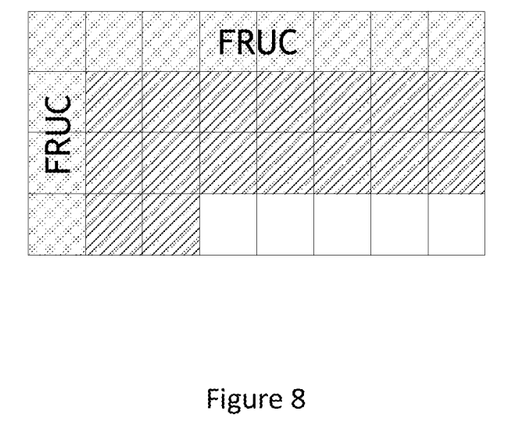
FIG. 8 shows an example of improved rows and columns of internal sub-blocks using average of refined neighbors (dashed) or whole refined coding unit (blank) using the present embodiments.

The two first rows and columns of internal sub-blocks (second and third ones of the CU) are derived using the average of up to 4 spatially neighboring MVs (from left, top, top-left and top-right neighbors) and of the refined motion vector of the entire CU. And, the remaining sub-blocks use the refined motion vector of the whole CU as shown on FIG. 8.

Figure 9:
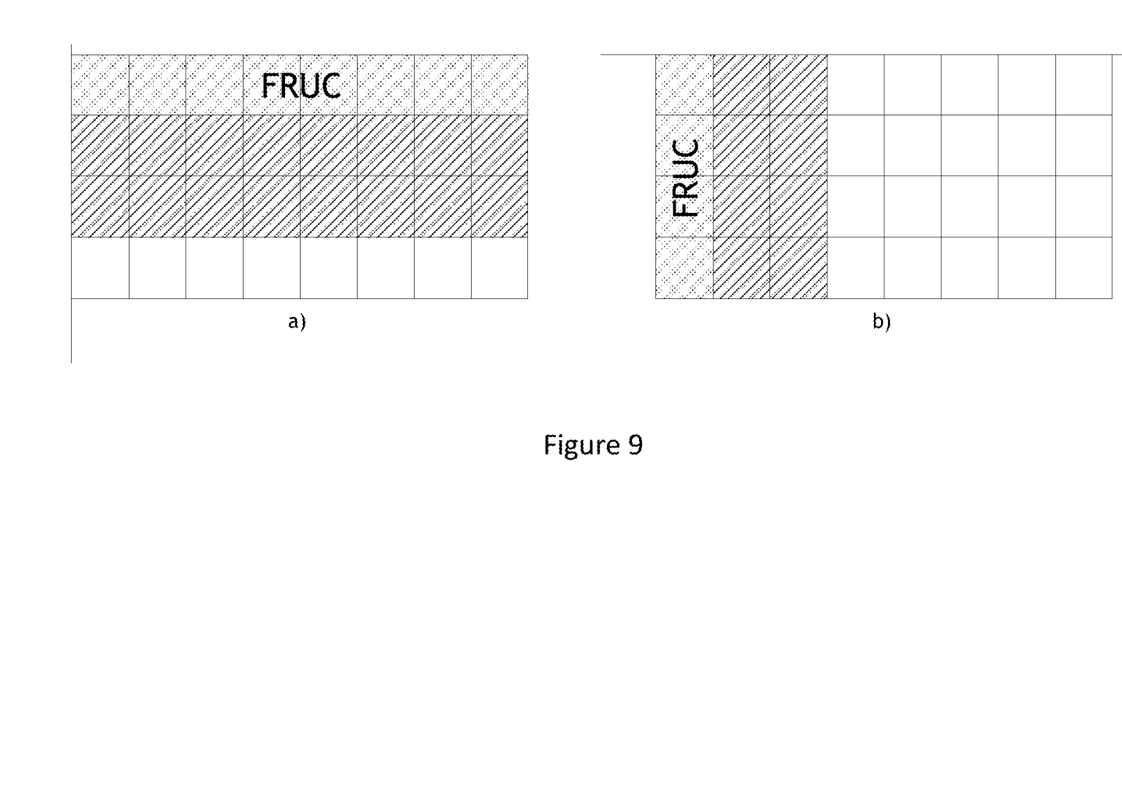
FIG. 9 shows examples of two particular cases on the a) left or b) top border of the frame.

FIG. 9 describes the particular cases where FRUC is not fully applicable, on left and top borders of the frame. On the left border (resp. top), FRUC can only be applied on the first row (resp. column) of sub-blocks, so the second and third rows (resp. columns) use the average of neighboring and whole CU refined motion vectors, and the remaining rows (resp. columns) use the whole CU refined motion vector.

Figure 10:
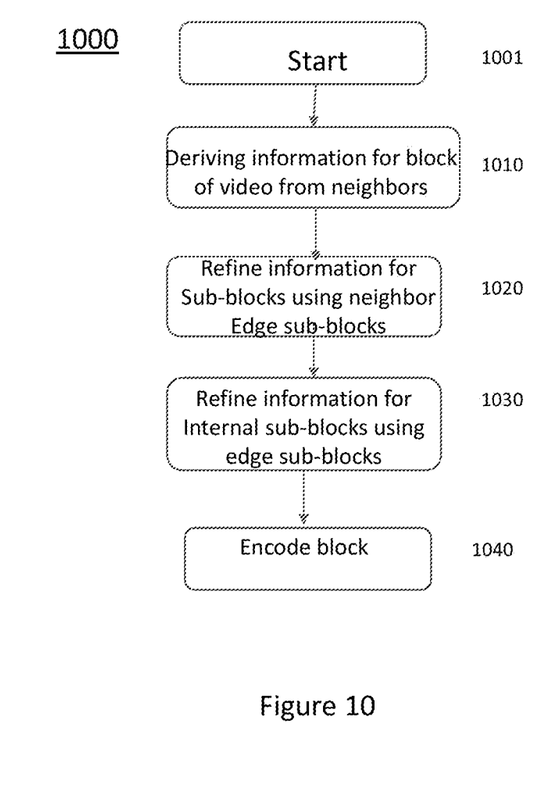
FIG. 10 shows one embodiment of an encoding method using the aspects described.

FIG. 10 shows one embodiment of a method 1000 under the aspects described. The method commences at Start block 1001 and control proceeds to block 1010 for deriving information for a block of video data from neighboring blocks previously encoded. Control proceeds from block 1010 to block 1020 for refining the information for sub-blocks along a left or top edge of the block of video data by using the derived information and neighboring sub-blocks previously encoded. Control then proceeds from block 1020 to block 1030 for refining the information for internal sub-blocks of the block of video data by using the refined information from sub-blocks along a left or top edge of the block of video data. Control then proceeds from block 1030 to block 1040 for encoding the block of video data using said refined sub-blocks.

Figure 11:
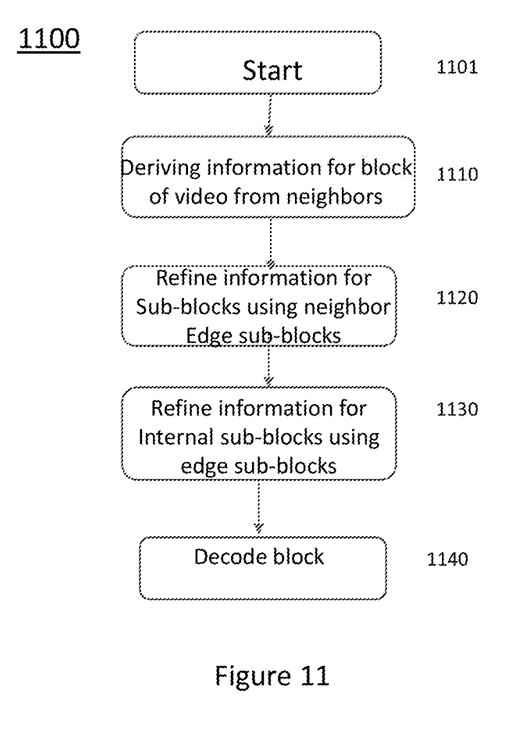
FIG. 11 shows one embodiment of a decoding method using the aspects described.

FIG. 11 shows one embodiment of a method 1100 under the aspects described. The method commences at Start block 1101 and control proceeds to block 1110 for deriving information for a block of video data from neighboring blocks previously encoded. Control proceeds from block 1110 to block 1120 for refining the information for sub-blocks along a left or top edge of the block of video data by using the derived information and neighboring sub-blocks previously encoded. Control then proceeds from block 1120 to block 1130 for refining the information for internal sub-blocks of the block of video data by using the refined information from sub-blocks along a left or top edge of the block of video data. Control then proceeds from block 1130 to block 1140 for decoding the block of video data using said refined sub-blocks.

Figure 12:
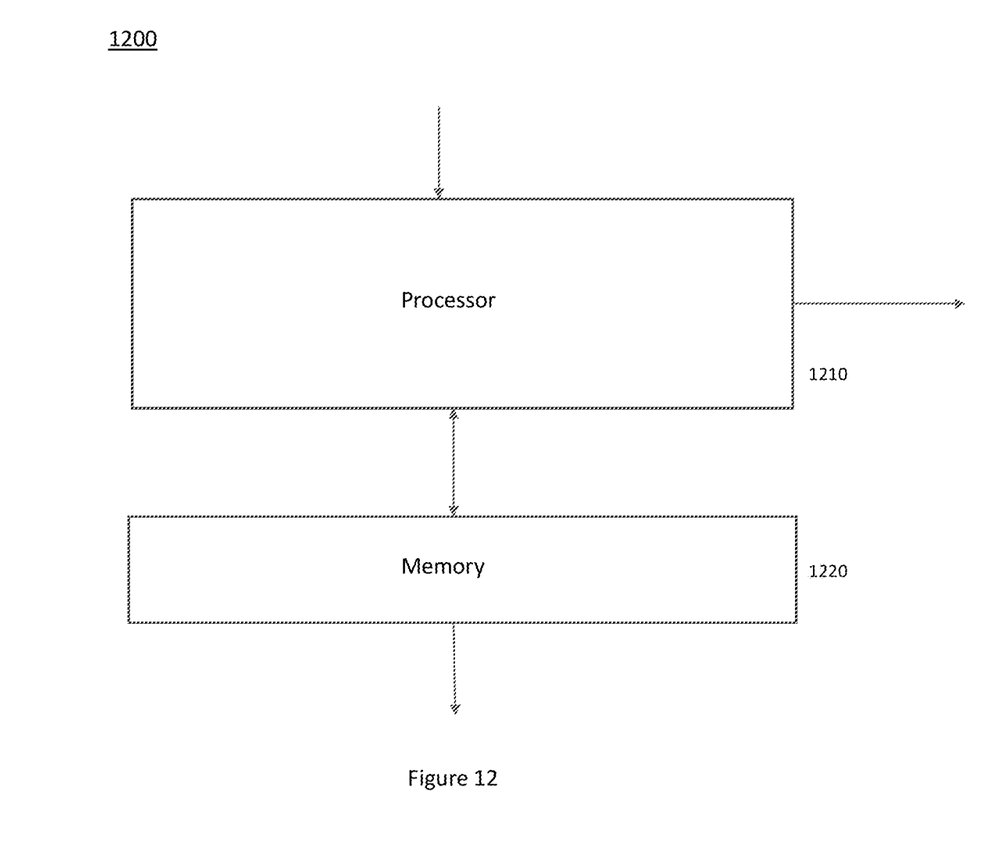
FIG. 12 shows one embodiment of an apparatus for encoding or decoding using the aspects described.

FIG. 12 shows one embodiment of an apparatus 1200 for coding or decoding a block of video data. The apparatus comprises Processor 1210 which has input and output ports and is in signal connectivity with Memory 1220, also having input and output ports. The apparatus can execute any of the aforementioned method embodiments, or variations.

The functions of the various elements shown in the figures can be provided using dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

The present description illustrates the present ideas. It will thus be appreciated that those skilled in the art will be able to devise various arrangements that, although not explicitly described or shown herein, embody the present ideas and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

In the claims herein, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In conclusion, an improved method of refinement of internal sub-blocks for encoding or decoding is provided. In the refinement, internal sub-blocks are refined using sub-block portions that have already been refined. This refinement can be motion information derived from the motion information of already refined sub-block portions, for example. Other embodiments provide other derivations of internal sub-blocks using other information. In addition, an embodiment uses other information to derive internal sub-blocks based on outer sub-block information.

The invention claimed is:

1. A method, comprising:
   obtaining motion vector information for a block of video data from neighboring blocks previously encoded;
   refining motion vector information for sub-blocks along a left or top edge of said block of video data by using the obtained motion vector information and neighboring sub-blocks previously encoded;
   refining motion vector information for a first row or column of internal sub-blocks of the block of video data by using the refined motion vector information from a first number of the sub-blocks along the left or top edge of the block of video data;
   refining motion vector information for a second row or column of internal sub-blocks of the block of video data by using the refined motion vector information from a second number of the sub-blocks along the left or top edge of the block of video data, the second number being less than the first number; and
   encoding the block of video data using the refined motion vector information.

2. A method, comprising:
   obtaining motion vector information for a block of video data from neighboring blocks previously decoded;
   refining motion vector information for sub-blocks along a left or top edge of said block of video data by using the obtained motion vector information and neighboring sub-blocks previously decoded;
   refining motion vector information for a first row or column of internal sub-blocks of the block of video data by using the refined motion vector information from a first number of the sub-blocks along the left or top edge of the block of video data;
   refining motion vector information for a second row or column of internal sub-blocks of the block of video data by using the refined motion vector information from a second number of the sub-blocks along the left or top edge of the block of video data, the second number being less than the first number; and
   decoding the block of video data using the refined motion vector information.

3. An apparatus, comprising:
   a memory and a processor which are configured to:
   obtain motion vector information for a block of video data from neighboring blocks previously encoded,
   refine motion vector information for sub-blocks along a left or top edge of said block of video data by using the obtained motion vector information and neighboring sub-blocks previously encoded,
   refine motion vector information for a first row or column of internal sub-blocks of the block of video data by using the obtained motion vector information from a first number of the sub-blocks along the left or top edge of the block of video data,
   refine motion vector information for a second row or column of internal sub-blocks of the block of video data by using the refined motion vector information from a second number of the sub-blocks along the left or top edge of the block of video data, the second number being less than the first number, and
   encode the block of video data using the refined motion vector information.

4. An apparatus, comprising:
a memory and a processor which are configured to:
obtain motion vector information for a block of video data from neighboring blocks previously decoded,
refine motion vector information for sub-blocks along a left or top edge of said block of video data by using the obtained motion vector information and neighboring sub-blocks previously decoded,
refine motion vector information for a first row or column of internal sub-blocks of the block of video data by using the refined motion vector information from a first number of the sub-blocks along the left or top edge of the block of video data,
refine motion vector information for a second row or column of internal sub-blocks of the block of video data by using the refined motion vector information from a second number of the sub-blocks along the left or top edge of the block of video data, the second number being less than the first number, and
decode the block of video data using the refined motion vector information.

5. The method of claim 1, wherein the obtaining of the motion vector information for the block of video data uses template matching prediction.

6. The method claim 1, wherein the first number and the second number of the sub-blocks along the left or top edge of the block of video data spatially neighbor the internal sub-blocks of the block of video data.

7. The method of claim 1, wherein the refining of the motion vector information for the first row or column of internal sub-blocks of the block of video data includes using the refined motion vector information from the first number of sub-blocks along the left or top edge of the block of video data in combination with refined motion vector information of neighboring temporal sub-blocks.

8. The method of claim 1, wherein the refining of the motion vector information for the first row or column of internal sub-blocks of the block of video data includes using the refined information motion vector information from the first number of sub-blocks along the left or top edge of the block of video data and the obtained motion vector information for the block of video data.

9. The method of claim 1, wherein the refining of the motion vector information for the first row or column of the internal sub-blocks of the block of video data uses a different method than the refining of the motion vector information for the second row or column of the internal sub-blocks of the block of video data.

10. The method of claim 9, wherein the refining of the motion vector information for the first row or column of internal sub-blocks of the block of video data uses an average or median of the refined motion vector information from the first number of sub-blocks along the left or top edge of the block of video data and the obtained motion vector information of the block.

11. The method of claim 2, wherein the obtaining of the motion vector for the block of video data uses template matching prediction.

12. The method of claim 2, wherein the first number and the second number of the sub-blocks along the left or top edge of the block of video data spatially neighbor the internal sub-blocks of the block of video data.

13. The method of claim 2, wherein the refining of the motion vector information for the first row or column of internal sub-blocks of the block of video data includes using the refined motion vector information from the first number of sub-blocks along the left or top edge of the block of video data in combination with refined motion vector information of neighboring temporal sub-blocks.

14. The method of claim 2, wherein the refining of the motion vector information for the first row or column of internal sub-blocks of the block of video data includes using the refined motion vector information from the first number of sub-blocks along the left or top edge of the block of video data and the obtained motion vector information for the block of video data.

15. The method of claim 2, wherein the refining of the motion vector information for the first row or column of the internal sub-blocks of the block of video data uses a different method than the refining of the motion vector information for the second row or column of the internal sub-blocks of the block of video data.

16. The method of claim 15, wherein the refining of the motion vector information for the first row or column of internal sub-blocks of the block of video data uses an average or median of the refined motion vector information from the first number of sub-blocks along the left or top edge of the block of video data and the obtained motion vector information of the block.

17. The method of claim 2, wherein the block is a coding unit (CU).

18. The method of claim 1, wherein the block is a coding unit (CU).

19. The apparatus of claim 3, wherein the motion vector information for the first row or column of internal sub-blocks of the block of video data includes is refined using the refined motion vector information from the first number of sub-blocks along the left or top edge of the block of video data in combination with refined motion vector information of neighboring temporal sub-blocks.

20. The apparatus of claim 3, wherein the motion vector information for the first row or column of internal sub-blocks of the block of video data includes is refined using the refined information motion vector information from the first number of sub-blocks along the left or top edge of the block of video data and the obtained motion vector information for the block of video data.

21. The apparatus of claim 3, wherein the refining of the motion vector information for the first row or column of the internal sub-blocks of the block of video data uses a different method than the refining of the motion vector information for the second row or column of the internal sub-blocks of the block of video data.

22. The apparatus of claim 3, wherein the block is a coding unit (CU).

23. The apparatus of claim 4, wherein the motion vector information for the first row or column of internal sub-blocks of the block of video data includes is refined using the refined motion vector information from the first number of sub-blocks along the left or top edge of the block of video data in combination with refined motion vector information of neighboring temporal sub-blocks.

24. The apparatus of claim 4, wherein the motion vector information for the first row or column of internal sub-blocks of the block of video data includes is refined using the refined information motion vector information from the first number of sub-blocks along the left or top edge of the block of video data and the obtained motion vector information for the block of video data.

25. The apparatus of claim 4, wherein the refining of the motion vector information for the first row or column of the internal sub-blocks of the block of video data uses a different method than the refining of the motion vector information for the second row or column of the internal sub-blocks of the block of video data.

26. The apparatus of claim 4, wherein the block is a coding unit (CU).

* * * * *